May 11, 1937.  H. F. ALBRECHT  2,080,026
ROLL CARRIER FOR PHOTOGRAPHIC STRIP FILM
Filed July 17, 1935   2 Sheets-Sheet 2

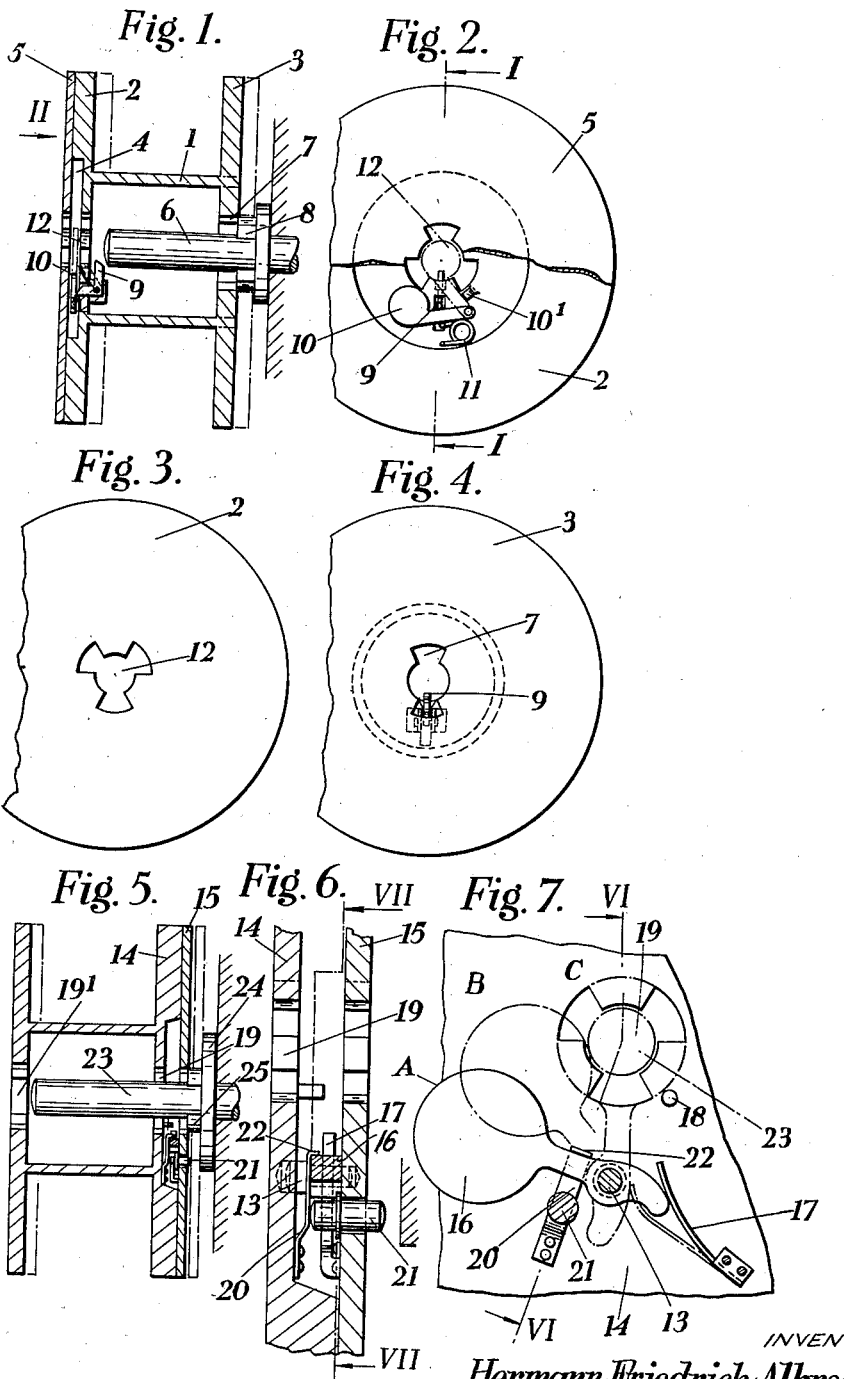

Herman F. Albrecht
INVENTOR.

BY
ATTORNEYS.

Patented May 11, 1937

2,080,026

UNITED STATES PATENT OFFICE 2,080,026

ROLL CARRIER FOR PHOTOGRAPHIC STRIP FILM

Hermann Friedrich Albrecht, Berlin-Friedrichshagen, Germany, assignor, by mesne assignments, to Eastman Kodak Company, Jersey City, N. J., a corporation of New Jersey Application July 17, 1935, Serial No. 31,795
In Germany October 25, 1934

10 Claims. (Cl. 242—71)

This invention relates to roll carriers for photographic strip films, that is to say film spools of the kind comprising a hub or core one or each end of which has an aperture which cooperates with a hub support or supports in the camera, or magazines for motion picture film and comprising a casing containing at least one hub, one or each end of which has an aperture which registers with an opening in the adjacent side wall of the casing.

In the case of a spool for roll film or a reel for cinematograph film, when the film has been wound off the spool or reel during exposure in the camera the empty spool is usually removed from the camera and, after end for end reversal, is brought into engagement with the take-up support or supports and the next film to be exposed is wound on this spool. Similarly, in reversible magazines for motion picture cameras and for use in recording two rows of images on the film, the images of one row being inverted relatively to those of the other row, when the film has been unwound from one reel within the magazine and the first row of images thus recorded, the magazine has to be removed and reversed so that the original reel is reversed end for end before being brought into engagement with the take-up support. The film is then rewound on the original reel during exposure of the second row of images.

It is sometimes difficult to determine whether the film carried by a spool or reel or a magazine of this type has or has not passed through a camera so that there is a risk that the roll carrier may be placed in the supply chamber or on the supply support or supports a second time and the film reexposed and thus spoilt, and the present invention has for its object to overcome this difficulty.

To this end a roll carrier according to the present invention comprises a hub upon which the film is wound and having, at least in one end, an aperture, and means whereby the aperture is automatically obstructed after a hub support has once been inserted into and withdrawn from the said aperture. In this way risk of a spool or reel carrying a film which has passed through the camera being replaced therein so as to reexpose the film is obviated.

The obstructing device may be automatically actuated by a part of the camera so as to obstruct the associated aperture in the hub after the hub has once been in cooperation with a hub support, or the obstructing device may be automatically actuated by a part of the camera so as to obstruct the aperture as and when a hub support is withdrawn from the said aperture.

When the hub has an axial bore therethrough an obstructing device may be associated with the opening at one end of the bore, with means whereby the said device will be automatically actuated by a take-up spindle within the camera when this spindle is passed through the hub from that end remote from the obstructing device.

In the accompanying drawings—

Figure 1 is a vertical section taken on line I—I of Fig. 2 showing a reel according to the invention for cinematograph film, the reel being about to engage the driving member on a take-up spindle, Figure 2 is an end elevation in the direction of the arrow II in Figure 1, with the cover disc cut away, Figure 3 illustrates the cover disc.

Figure 4 is an elevation from that end of the reel remote from the cover disc,

Figure 8:
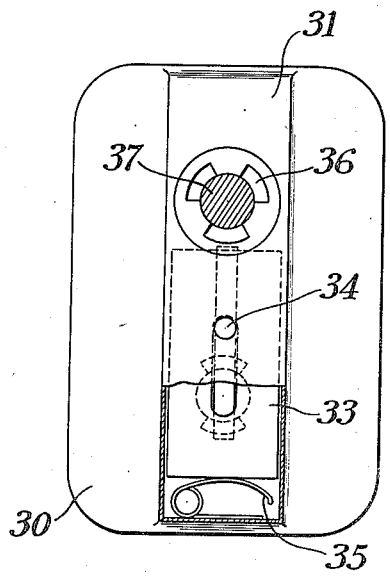
Figure 10:
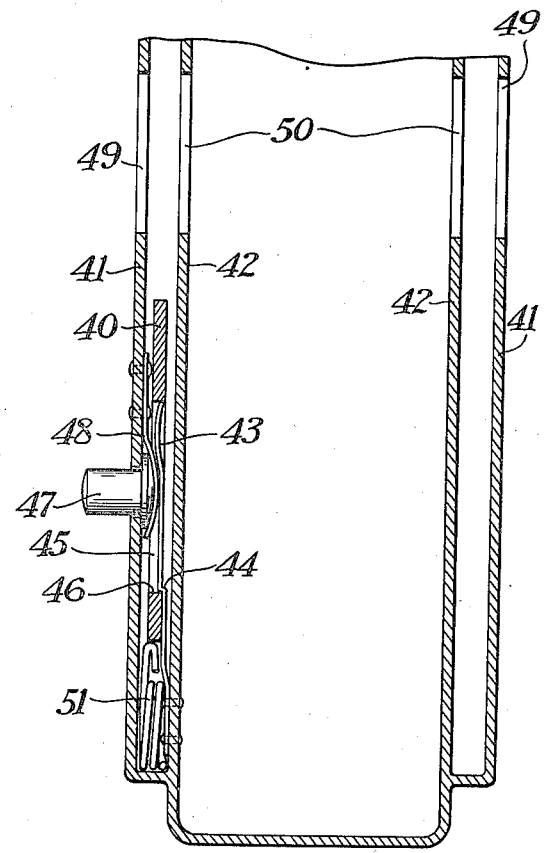
Figure 9:
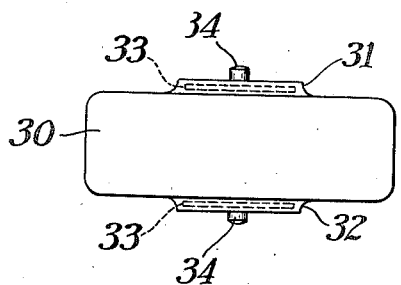
Figure 11:
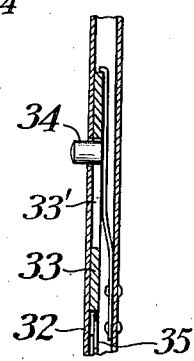

Figure 5 shows another reel also according to the invention, in position on a supply spindle, Figures 6 and 7 illustrate, on an enlarged scale, the obstruction device and operating mechanism therefor included in Figure 5, Figure 6 being a section on the line VI—VI of Figure 7 whilst Figure 7 is a section on the line VII—VII of Figure 6, Figures 8 and 9 show in side elevation and plan respectively one construction of motion picture magazine embodying the invention, Figure 10 illustrates in vertical section and on an enlarged scale another construction of obstruction device and operating mechanism therefor which may be employed in a magazine, and Figure 11 is a fragmentary enlarged perspective view of the latch mechanism used with the magazine shown in Figures 8 and 9.

In the construction illustrated in Figure 1 the reel comprises a hub 1 furnished with two flanges 2 and 3. The outer surface of the flange 2 has a recess 4 which is covered by a disc 5. As illustrated in the drawings the reel is about to be placed in engagement with a take-up spindle 6 driven by the camera, the flange 3 having a central key-hole aperture 7 (Figure 4) constructed to cooperate with a driving member 8 secured to or formed on the take-up spindle 6. The dot-and-dash-lines show the spool fully seated on the spindle.

A trigger 9 pivotally mounted within the hub of the reel normally locks a pivoted shutter 10 in the inoperative or open position shown in Figure 2, the shutter 10 being urged towards its operative or closed position by a spring 11. When the reel is placed on the take-up spindle 6 the end of the spindle engages the trigger 9, as shown in Figure 1, and turns the trigger in the counter clockwise direction so that the shutter 10 is released and is turned in the clockwise direction as shown in Figure 2 so as to cover the aperture 12 in the flange 2. As will be seen from Figure 1 the length of the spindle 6 is such that its end will engage and actuate the trigger 9 only when a driving connection is established between the driving member 8 and the driving aperture 7 in the reel. The shutter 10, which now bears against a stop 10', thus covers the aperture 12 to prevent the reel from being reversed end for end and replaced on the supply spindle with the flange 2 innermost. In this way when a film has passed through the camera and been wound on the reel, this film cannot be again passed through the camera from this reel.

The outer surface of the shutter 10 may be inscribed with the word "exposed" or may be coloured with a view to giving clearer visual indication that the reel has been employed as a take-up reel and the film thereon has therefore passed through the camera.

If an attempt is made to incorrectly place the reel upon the take-up spindle 6 by inserting the spindle first through the aperture 12, the shutter 10 carried by flange 2 will not function, because, as the reel is inserted on the end of the shaft 6, this shaft will strike the trigger 9 which can only be turned in a counter-clockwise direction. Consequently, the trigger will not release the shutter, and it will also prevent the reel from being fully positioned on the shaft 6. When, however, the reel is removed and properly inserted on the shaft 6 with the flange 3 toward the shaft, the end of the shaft 6 may turn the trigger 9 in a clockwise direction, so as to release the shutter as above described. In other words, when an attempt is made to incorrectly position the reel on the spindle 6, the shutter 10 cannot be actuated.

Figures 5, 6 and 7 illustrate a construction wherein an aperture in the hub is automatically closed when a hub support has once been placed in and withdrawn from this aperture. In this construction a pivot pin 13 arranged between the flange 14 of a reel (of the same type as that illustrated in Figure 1) and a cover disc 15 carries a shutter 16 controlled by a spring 17 which tends to turn the shutter in the clockwise direction as viewed in Figure 7. The spring 17 thus tends to turn the shutter 16 towards the position in which it engages a stop 18 and covers the aperture 19 in the flange 14, this aperture being formed as shown for the aperture 12 in Figure 3 whilst the aperture 19' in the other end of the hub is differently formed, say, as shown in Figure 4. A spring pawl 20 secured to the flange 14 carries a push button 21 which projects freely through an opening in the cover disc 15, the pawl 20 having a nose 22 which normally engages the shutter 16 and holds this in the inoperative or open position shown at A in Figure 7.

When the reel is placed on the supply spindle 23 as shown in Figure 5 by passing this spindle first through the aperture in the cover disc 15 and then through the aperture in the flange 14 the push button 21 comes into engagement with a fixed part 24 of the camera at which time the reel is moved to the broken line position. The push button 21 is forced inwards and the pawl 20 is flexed so that the nose 22 is disengaged from the shutter 16 which is thereby released.

The shutter 16 is thus turned in the clockwise direction, as viewed in Figure 7, by the spring 17 from the position A to the position B in which one edge of the shutter 16 bears against the supply spindle 23 lying in the apertures 19 and 19'. When all the film has been unwound from the reel on the supply spindle and this reel is removed the shutter 16 moves from the position B to the position C in which it closes the aperture 19. Though therefore the reel can now be reversed end for end and placed on a take-up spindle this reel cannot be replaced on the supply spindle. Thus, when the reel has been used as a take-up reel this reel bearing the exposed film cannot be replaced on the supply spindle and risk of reexposure of the film is therefore obviated.

As will be seen from Figure 5, the push button 21 will not be operated until a member 25 on the supply spindle 23 has been fully engaged with the correspondingly shaped apertures in the flange 14 and disc 15, i. e. until the reel is in the position shown in chain line in Figure 5. It is thus not possible for the operator to cause premature operation of the shutter 16 by initially placing the reel on the take-up spindle with the disc 15 innermost, since the driving member on the take-up spindle for cooperation with the correspondingly shaped aperture 19' will not enter the aperture in the disc 15.

The shutter mechanisms above described are applicable not only to reels for motion picture film but also to other roll carriers of the kind comprising a hub, one or each end of which has an aperture for cooperation with supply and take-up supports in the camera and in which the carrier after the film carried thereby has passed through the camera has to be reversed so that the hub upon which the film was originally wound is reversed end for end before being placed in engagement with the take-up mechanism.

The invention may be applied to reversible magazines for motion picture cameras in which two rows of images are recorded on the film with the images in one row inverted relatively to those of the other row. With magazines of this type, when the magazine has been placed in the camera and the film wound from the original reel or core so as to expose one half of the width of the film, the magazine has to be removed and inverted and reversed before being replaced in the camera so that a driving connection is established with the original reel or core which is now in a position which is the reverse, end for end, of that which it occupied on the supply spindle. The reel or core upon which the virgin film was originally wound has apertures in its ends, at least one of which registers with an aperture in the side wall of the magazine so as to permit a driving connection to be established between the reel and a driving member on the camera. One or each of the apertures associated with the original reel or core and, if desired, also one or each of the apertures associated with a second reel within the magazine may be furnished with an obstructing device, say, as described with reference to Figure 1 or with reference to Figures 5, 6 and 7. If each of the apertures associated with the original reel in the magazine is furnished with an obstructing device as described with reference to Figures 5, 6 and 7 the aperture or apertures which lie innermost during the first traverse of the film through the camera will be automatically closed when the magazine is withdrawn for reversal whilst, in addition, when the second traverse of the film has been completed and the magazine removed the second aperture associated with the original reel will be automatically closed so that the magazine cannot be again brought into cooperation with the camera in either of the relatively reversed positions. Thus, the magazine may be safely removed from the camera after the first traverse of the film and stored without any risk of the half width of the film which has already been exposed being again exposed and spoilt.

Figures 8 and 9 illustrate one construction of reversible magazine embodying the invention. In this construction the magazine comprises a casing 30 having two side compartments 31 and 32 each of which contains a slide or shutter 33. Each shutter 33 is held in the position shown by a latch similar to the pawl 20 described with reference to Figures 5, 6 and 7. Each pawl is controlled by a push button 34 and the shutter 33 is urged towards its operative or closed position by a spring 35. When therefore the magazine is placed in the camera with the compartment 31 inwards so that the aperture 36 registering with one end of the empty reel permits the entry of a take-up support 37 within the camera, the push button 34 projecting from the wall 31 is forced inwards and the corresponding shutter 33 released so that it moves into engagement with the spindle 37. When therefore one half of the width of the film has been exposed and the magazine 30 is removed, the shutter 33 moves over and closes the aperture 36.

In the modified construction illustrated in Figure 10 a slide or shutter 40 is arranged between an outer auxiliary wall 41 and the outer wall 42 of a magazine casing. These walls include coaxial spindle apertures 49 and 50. A spring blade 43 is secured to the wall 42 and is furnished with a shoulder 44 which normally lies within a slot 45 in the shutter 40 so that the shoulder 44 engages one edge 46 of this slot and prevents upward movement of the shutter 40 under the action of a spring 51. This shutter 40 is a flat plate of a width sufficient to cover or obstruct the coaxially arranged spindle apertures 49 and 50, the slot 45 being preferably only of a width sufficient to receive the spring 43. A push button 47 projects through the auxiliary wall 41 of the magazine and bears at its inner end against a leaf spring 48 so that when the magazine is placed in the camera with the take-up spindle passing first through the aperture 49 in the wall 41 and then through an aperture 50 in the wall 42, the push button 47 engages a fixed part such, for example, as the mechanism plate within the camera, and the spring blade 43 is flexed inwards so that the shoulder 44 is disengaged from the edge 46 of the slot 45. The shutter 40 is thus released and moves upwards until the edge 46 of the slot 45 engages the inner end of the push button 47, the shutter 40 being thus held from further upward movement in the direction of the arrow D. When one half of the width of the film has been exposed and the magazine is removed for reversal the spring 48 moves the push button 47 outwards and thus releases the shutter 40 which therefore moves so as to close the apertures 49 and 50.

As shown in Figure 11, the latch member may consist of a push-button 34 which is adapted to hold the shutter member 33 against the action of spring 35 until this push-button is depressed, as by placing the magazine in a camera. As soon as the push-button is depressed, the slide member 33 is permitted to slide up under the impulse of spring 35, since the slot 33' in member 33 permits this movement to such an extent that the slide may cover the aperture 36 and prevent a shaft 37 from being inserted in this opening after the magazine has been removed from a camera.

It will be understood that the constructions above described are given by way of example only and that details may be modified.

What I claim as my invention and desire to secure by Letters Patent is:—

1. In a roll carrier for photographic strip film, in combination, a hub upon which the film is wound and having an aperture in at least one end, and means whereby the aperture is automatically obstructed after a hub support in a camera has once been inserted into and withdrawn from the said aperture.

2. In a roll carrier for photographic strip film, in combination, a hub upon which the film is wound and having an aperture in at least one end, an obstructing device associated with the said aperture, and means whereby the said device will be automatically actuated by a part of a camera and will obstruct the associated aperture after the hub has once been in cooperation with a hub support in a camera.

3. In a roll carrier for photographic strip film, in combination, a hub upon which the film is wound and having an aperture in at least one end, an obstructing device associated with the said aperture, and means whereby the said device will be automatically actuated by a part of a camera and will obstruct the aperture as and when a hub support in a camera is withdrawn from from the said aperture.

4. In a roll carrier for photographic strip film, in combination, a hub upon which the film is wound and having an axial bore therethrough, an obstructing device associated with the opening at one end of the bore, and means whereby the said device will be automatically actuated when a take-up spindle in a camera is passed through the hub from that end of the bore remote from the obstructing device.

5. In a roll carrier for photographic strip film, in combination, a hub upon which the film is wound and having an axial bore therethrough, an obstructing device associated with the opening at one end of the bore, means whereby the said device will be automatically actuated when a take-up spindle in a camera is passed through the hub from that end of the bore remote from the obstructing device which latter is actuated only when a driving connection has been established between the hub and the said take-up spindle.

6. In a roll carrier for photographic strip film, in combination, a hub upon which the film is wound and having an axial bore therethrough, an obstructing device associated with the opening at one end of the bore and comprising a shutter and a spring urging the shutter towards an operative position in which it will cover the opening, and a trigger normally holding the shutter in its inoperative position, the said trigger being operated to release the shutter when a take-up spindle in a camera is passed through the hub from that end of the bore remote from the obstructing device.

7. In a roll carrier for photographic strip film, in combination, a hub upon which the film is wound and having an axial bore therethrough, an obstructing device associated with the opening at one end of the bore and comprising a shutter and a spring urging the shutter towards an operative position in which it will cover the opening, and a trigger normally holding the shutter in its inoperative position, the said trigger being operated to release the shutter only when a take-up spindle in a camera is passed through the hub from that end of the bore remote from the obstructing device and a driving connection has been established between the hub and the said take-up spindle.

8. In a roll carrier for photographic strip film, in combination, a hub upon which the film is wound and having an aperture in at least one end, an obstructing device associated with the said aperture and comprising a shutter and a spring urging the said shutter towards an operative position in which it will cover the associated aperture in the hub, and latching mechanism normally holding the shutter in an inoperative position but which will be released by engagement with a part carried by a camera and the shutter thus allowed to close the associated aperture in the hub when the hub is removed from the camera.

9. In a roll carrier for photographic strip film, in combination, a hub upon which the film is wound and having an aperture in at least one end, an obstructing device associated with the said aperture and comprising a shutter and a spring urging the said shutter towards an operative position in which it will cover the associated aperture in the hub, latching mechanism normally holding the shutter in an inoperative position, and an actuating member projecting from the carrier and which will be engaged by a part carried by a camera and the latching mechanism thus released when the carrier is inserted in the camera, the shutter being thus free to move into its closed position when the carrier is removed from the camera.

10. In a roll carrier for photographic strip film, in combination, a hub upon which the film is wound and having an aperture in at least one end, an obstructing device associated with the said aperture and comprising a shutter and a spring urging the shutter towards an operative position in which it will cover the associated aperture in the hub, latching mechanism normally holding the shutter in its inoperative position and comprising a trigger and an actuating member projecting from the carrier and which will be engaged by a part carried by a camera and the latching mechanism thus released when the carrier is inserted in the camera, and means whereby the actuating member prevents full movement of the shutter into its closed position until the carrier is removed from the camera.

HERMANN FRIEDRICH ALBRECHT.